Patented Apr. 28, 1936

2,039,206

UNITED STATES PATENT OFFICE 2,039,206

MANUFACTURE OF AN ELASTIC CAOUTCHOUC-LIKE BODY

Jean Baer, Uster, Switzerland

No Drawing. Application June 27, 1928, Serial No. 288,819. In Switzerland October 15, 1927

8 Claims. (Cl. 260—6)

It has been discovered that an elastic caoutchouc-like body which can be worked like natural caoutchouc in the usual machines in the rubber industry, can be mixed with the known filling materials, zinc oxide, soot, magnesia etc. as well as any desired admixture of natural caoutchouc factis, regenerates etc. and which can be moulded and vulcanized, is obtained if solutions of metal alkali sulphides, alkaline earth metal sulphides and the like in polysulphide form are allowed to react for the purpose of polymerization with an aldehyde, preferably formaldehyde, or with a mixture of the same with saturated halogenized hydrocarbons of the group $C_nH_{2n+2}$, whilst heated or at a normal temperature. The resulting product is an elastic caoutchouc-like body soluble in carbon disulphide.

Example 100 parts of an aqueous solution of potassium polysulphide, calium polysulphide, ammonium polysulphide etc. is caused to react with 6 parts of formaldehyde whilst heated to about 100° C. An elastic caoutchouc-like body results which is soluble in carbon disulphide. The reaction can also take place at ordinary temperature if allowed to stand for some days.

The sulphide reaction can also take place with a mixture of an aldehyde such as formaldehyde or acetaldehyde with ethylene dichloride, ethylene dibromide, methylene dichloride, methylene dibromide and other saturated halogenized hydrocarbons of the group $C_nH_{2n+2}$. In this case constituent parts of the mixture may be in equal proportions, thus for instance in the above example instead of 6 parts of formaldehyde a mixture of 3 parts of formaldehyde and 3 parts of ethylene dichloride may be used.

In all cases the mass of reaction constitutes a tough, elastic resistant mass similar to natural caoutchouc and soluble in carbon disulphide.

What I claim is:

1. A process for the manufacture of an elastic caoutchouc-like body, consisting in heating a solution of a metal polysulphide of the alkali and alkaline earth group with an aldehyde.

2. A process for the manufacture of an elastic caoutchouc-like body, consisting in heating a solution of a metal polysulphide of the alkali and alkaline earth group with formaldehyde.

3. A process for the manufacture of an elastic caoutchouc-like body, consisting in heating a solution of a metal polysulphide of the alkali and alkaline earth group with a mixture of an aldehyde and a saturated dihalogenized hydrocarbon of the group $C_nH_{2n+2}$.

4. A process for the manufacture of an elastic caoutchouc-like body, consisting in heating a solution of a metal polysulphide of the alkali and alkaline earth group with a mixture of formaldehyde and a saturated dihalogenized hydrocarbon of the group $C_nH_{2n+2}$.

5. As new article of manufacture, the herein described elastic caoutchouc-like body obtained by the reaction of a solution of a metal polysulphide of the alkali and alkaline earth group with an aldehyde, the mass of reaction constituting a tough, elastic, resistant mass similar to natural caoutchouc and soluble in carbon disulphide.

6. As new article of manufacture, the herein described elastic caoutchouc-like body obtained by the reaction of a solution of a metal polysulphide of the alkali and alkaline earth group with a mixture of an aldehyde and a saturated dihalogenized hydrocarbon of the group $C_nH_{2n+2}$, the mass of reaction constituting a tough, elastic, resistant mass similar to natural caoutchouc and soluble in carbon disulphide.

7. A process for the manufacture of an elastic caoutchouc-like body consisting in heating a solution of an alkaline polysulphide with an aldehyde.

8. A process for the manufacture of an elastic caoutchouc-like body consisting in heating a solution of an alkaline polysulphide with formaldehyde.

JEAN BAER.